Sept. 4, 1962 R. R. SCOVILLE 3,052,821

CASING FOR MODULAR UNITS

Filed Feb. 10, 1958

INVENTOR

Ray R. Scoville

BY Moore & Hall

ATTORNEYS

United States Patent Office 3,052,821

Patented Sept. 4, 1962

3,052,821
CASING FOR MODULAR UNITS

Ray R. Scoville, Los Angeles, Calif.
(1100 Flower St., Glendale 1, Calif.)

Filed Feb. 10, 1958, Ser. No. 714,089
5 Claims. (Cl. 317—101)

The present invention relates to casing assemblies for supporting and containing electrical circuits, preferably of the modular unit type; and is more particularly concerned with a novel case construction capable of more ready assembly, disassembly, and installation, than has been possible heretofore.

Modular electronic units are, at the present time, an accepted structural or layout standard in a large part of the electronic industry. Such units find use, for example, in computer applications wherein various types of circuits, such as counters, flip-flops, amplifiers, and the like, can be individually fabricated and housed for interchangeable interconnection with one another, thereby to form a desired overall circuit. The circuits themselves, as so housed, may include vacuum tube and/or transistor circuits, printed circuit assemblies, and the like; and a large number of integrated electronic circuits individually housed may be interconnected in any desired variety of ways.

Structures of the type discussed above ordinarily require some form of external housing to provide a mechanical packaging as well as an electrical shielding for each particular modular unit; and various forms of housing structures have been suggested in the past. One typical form of such housing structure has taken the configuration of a metallic case containing and supporting an electronic circuit whereby the case material acts as a shield for said unit. Cases of the types suggested heretofore, however, have been subject to a number of distinct disadvantages. In particular, their design has been such that a relatively large plurality of parts are interconnected to one another thereby making it difficult to assemble and disassemble the case; and making it extremely difficult to wire and install a circuit within the case and/or to gain access to the circuit once it is so installed. Prior case constructions have, in addition, been such that relatively little room has been provided for the circuit to be carried by said case. Notwithstanding these difficulties, prior modular casing units have been relatively expensive and difficult to manufacture, install and maintain.

The present invention serves to obviate these known difficulties of prior modular casing units; and relates to an improved casing unit so constructed that a circuit to be carried by said casing unit can be prewired outside of the case and thereafter readily installed in said case; and further so constructed that ready access may be had to said circuit after installation in the case, without requiring a large number of manipulative steps in disassembling of the case.

It is accordingly an object of the present invention to provide a novel modular unit of the pluggable type.

A further object of the present invention resides in the provision of an improved modular unit adapted for more ready assembly and disassembly than has been possible heretofore.

A further object of the present invention resides in the provision of a casing element for use in modular construction, comprising a plurality of parts interconnected to one another in a novel manner, whereby access may be had to the interior of the casing without completely disassembling the casing; and whereby complete disassembly of the casing, when desired, may be effected more readily than has been possible heretofore.

A still further object of the present invention resides in the provision of a novel casing unit for supporting and electrically shielding an electronic circuit; and including cover plates so arranged that said cover plates may be left off the unit, if desired, to increase ventilation of the aforementioned circuit without affecting the utility of the remaining portions of the case.

A still further object of the present invention resides in the provision of a novel case for supporting an electronic unit, which case, for a given overall casing volume, is constructed and arranged to provide more room on the interior thereof for supporting an electronic circuit than has been possible heretofore.

A still further object of the present invention resides in the provision of a case for electronic circuits which is more readily and inexpensively manufactured than has been possible heretofore; which may be easily manufactured in various sizes, as desired, without requiring extensive retooling; and which presents a better appearance than prior cases.

Another object of the present invention resides in the provision of a novel casing unit, comprising a supporting frame associated with removable cover plates, wherein said cover plates provide structural support for the aforementioned frame thereby increasing the mechanical strength of the overall unit without materially reducing the space available within said unit for the mounting of a circuit.

In providing for the foregoing objects and advantages, the present invention contemplates the provision of a novel case comprising a two-piece center section, each of which pieces is preferably of U-shaped configuration. The said two center section pieces are separably fastened to one another thereby to form an open-sided flat walled frame, preferably of substantially rectangular configuration; and means are provided for mounting an electrical circuit within the said frame between the open sides thereof. The said frame may in turn be further associated with a pair of cover plates dimensioned to fit within said frame adjacent the open sides thereof, whereby the outer peripheral edges of the said cover plates, when they are utilized, structurally brace and support the frame thereby giving the overall unit considerable mechanical strength. The two center sections or frame members also include indents, slots, etc. so positioned that the aforementioned cover plates may be removably pivoted to one of the center sections whereby the said cover plates can be removed without disassembling the center frame or otherwise affecting the electrical unit carried by said frame; and the cover plates themselves include resilient means such as spring clips adapted to engage complementary slots defined in the center frame, whereby said cover plates may be readily snapped into or out of the overall assembly.

The foregoing objects, advantages, construction and operation of the present invention will become more readily apparent from the following description and accompanying drawings, in which.

Figures 1, 2, 3, 4:
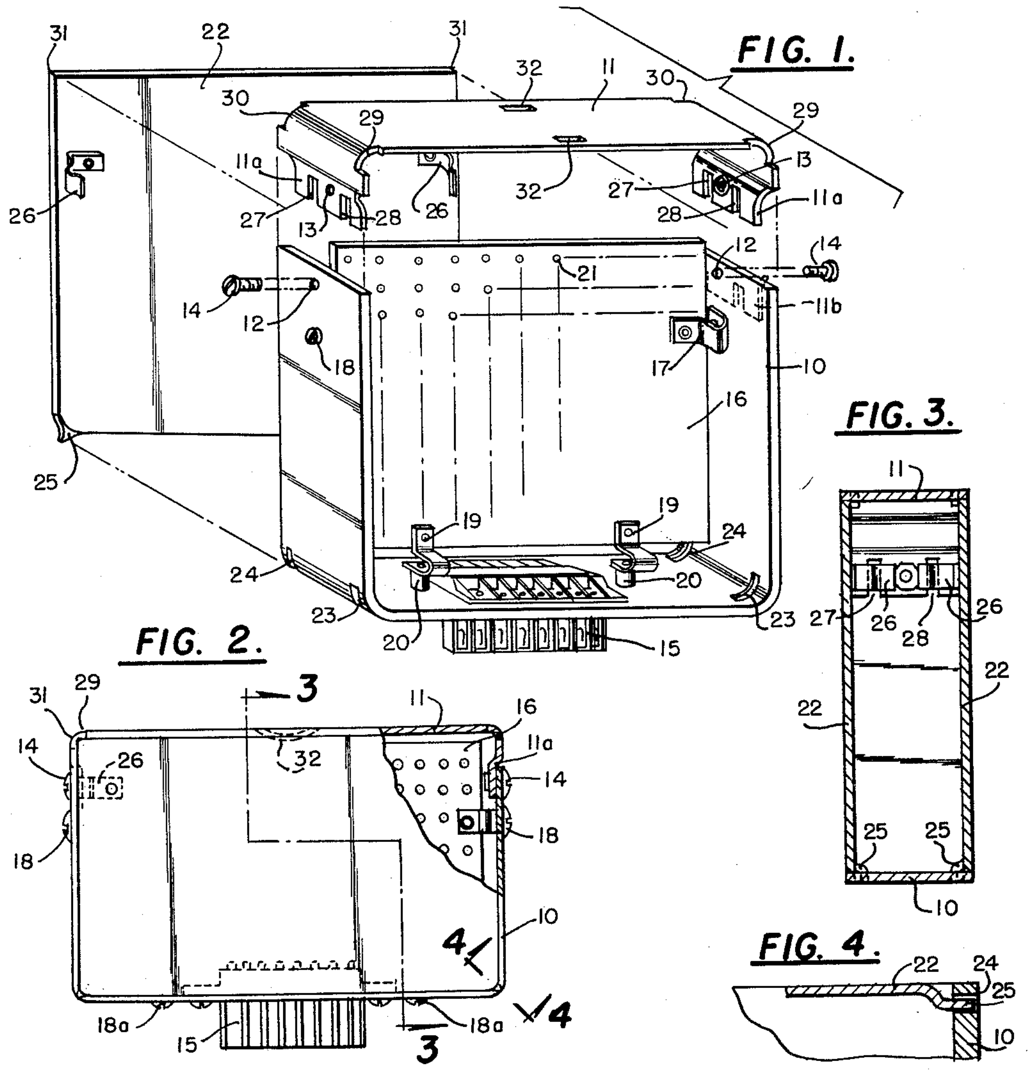
FIGURE 1 is a partially exploded perspective view of an improved modular unit and casing therefor, constructed in accordance with the present invention.
FIGURE 2 is a side view, partially in section, of the assembled structure shown in FIGURE 1.
FIGURE 3 is a view taken on line 3—3 of FIGURE 2, with the terminal board removed.
FIGURE 4 is a view taken on line 4—4 of FIGURE 2.

Referring now to the several figures, like numerals of which relate to like parts, it will be noted that an improved case constructed in accordance with the present invention comprises a pair of center section pieces or frame members 10 and 11, each of which is of substantially U-shaped configuration. The legs of the center section 10 are substantially longer than the legs of center section 11, and the free ends 11*a* of the section 11 legs are adapted to fit within the legs of section 10 in overlapping relation closely adjacent thereto, as shown at 11*b* in FIGURE 1. Section 10 defines a pair of apertures 12 concentric with threaded apertures 13 in section 11, whereby when the two frame sections 10 and 11 are assembled, as illustrated in FIGURE 2, they may be retained in place by a total of only two screw members 14 passing through the apertures 12 and threaded into apertures 13.

It will be noted that the structure thus far described, comprising sections 10 and 11, may be assembled to provide a flat walled open-sided substantially rectangular frame which is readily separable into two parts by the simple expedient of removing the two screws 14. The assembly and disassembly of the two parts 10 and 11 is therefore considerably simpler than has been possible with multiple-section cases suggested heretofore; and indeed, as will become apparent from the subsequent description, the assembly and disassembly of the two parts 10 and 11 need not be effected except in those instances where the actual installation or removal of the overall electrical circuit is desired, inasmuch as the electrical circuit carried by said unit (to be described subsequently) is accessible without disassembly of parts 10 and 11.

Part 10 contains in the base thereof a multiple terminal plug 15 adapted to carry electrical connections from the exterior to the interior, and vice versa, of the frame 10—11. The central frame member 10—11 also carries a relatively large terminal board 16 extending substantially parallel to the open sides of the frame member intermediate the open sides thereof. Terminal board 16, as carried by said central frame, is attached to frame member 10 only, by a pair of brackets 17 (only one of which is shown) held in place by screw members 18 passing through the legs of said frame member 10, as well as by a further pair of brackets 19 attached to posts 20 and fastened to the base of frame member 10 by other screws 18*a* (see FIGURE 2).

By reason of this configuration, therefore, the terminal board 16 can be mounted and held within U-shaped frame member 10 by a total of four screws; and when so mounted, the parts 10 and 11 of the central frame section can still be assembled and disassembled without disturbing the terminal board 16 or any circuits carried thereby. Indeed, by virtue of this particular arrangement, the terminal board 16 can, if desired, be prewired and thereafter installed in frame member 10 with appropriate electrical connections being made to terminal plug 15 after mechanical installation of the said terminal board 16; and this feature of the overall unit represents a material advantage over case units suggested heretofore, wherein unit wiring often had to be done within the confines of the case itself, with a resultant increase in both expense and difficulty of circuit installation.

Terminal board 16 preferably comprises an insulating composition, and includes a plurality of apertures 21 adapted to support electrical components such as resistors, capacitors, semiconductor diodes, transistors, and the like. In the alternative, however, it will be appreciated that terminal board 16 may comprise a printed circuit, depending upon the particular type of electrical unit to be housed in the overall case.

The open-sided substantially rectangular frame 10—11 comprises a metallic material, such as aluminum, adapted to shield the electrical circuit carried thereby; and the open sides of the center frame are adapted to be closed by a pair of metallic protective and shielding cover plates 22 (only one of which is shown in FIGURE 1) located respectively adjacent the opposite open sides of the center frame 10—11. Lower frame member 10 includes pairs of slots 23 and 24 disposed adjacent each open side of the frame member; and the cover plates 22 have the lower corners 25 thereof offset from the plane of the cover plates, whereby these offset corners or tips 25 are adapted to be inserted into a selected pair of slots 23 or 24, for removably pivoting the cover plates 22 to the lower portion 10 of the central frame 10—11. Each of the cover plates 22 includes, in addition, a pair of spring clips 26 adapted to selectively engage slots 27 and/or 28 provided adjacent the free ends 11*a* of the upper U-shaped member 11.

By reason of this structure, therefore, once the parts 10 and 11 are assembled to form the aforementioned open sided substantially rectangular frame, the cover plates 22 can be installed on the frame by inserting the projecting offset tips 25 into an appropriate pair of slots 23 or 24, whereafter the cover plates 22 are pivoted about tips 25 until spring clips 26 snap into the slots 27 or 28 defined on the interior of the frame 10—11 by the upper frame member 11.

The upper frame member 11, in addition to providing the aforementioned slots or apertures 27 and 28, is rounded at its corners, as illustrated in FIGURE 1, and includes, adjacent said rounded corners, pairs of depressions 29 and 30 adapted to receive the upper non-offset corners 31 of the cover plates 22. In this respect, see particularly FIGURE 2 which illustrates how the upper corners 31 are disposed relative to depressions such as 29 in the upper member 11 when the cover plates are in place.

The cover plates 22 are so dimensioned that the outer peripheral edges thereof lie within and closely adjacent to the inner periphery of the central frame parts 10 and 11 when the overall device is assembled. The offset cover plate corners or tips 25, as well as the member 11 depressions 29 adapted to receive upper cover plate corners 31, permit the said cover plates to be inserted within the central frame 10—11, as aforesaid; and by reason of this configuration, the cover plates 22 act as bracing supports for the overall frame 10—11 when said cover plates are in place, whereby the overall structure exhibits considerable mechanical strength. In addition the upper frame member 11 defines a pair of projections or depressions 32 spaced from the elongated edges of member 11 by a distance corresponding to the thickness of the material comprising cover plate 22 whereby, when the cover plates 22 are assembled into the overall unit, projections or depressions 32 support the inner upper edges of the said cover plates in such relations to the remainder of the structure that the outer surfaces of the cover plates are substantially flush with the outer peripheral edges of the frame member 10—11. This flush configuration of cover plates, in addition to giving the overall unit an excellent appearance, increases the amount of room available within the unit 10—11 for the carrying of an electronic circuit, and simultaneously permits the said cover plates to perform their bracing function as aforesaid, as well as to perform an electrical shielding function adjacent the sides of the otherwise open frame 10—11.

By reason of the configuration of cover plates 22, and their mounting in the frame 10—11, the said cover plates can be readily removed from the overall assembly by the simple expedient of grasping said cover plates, e.g. adjacent their upper corners 31, and then snapping said cover plates out of the assembly. When the cover plates are so removed, access may be had to the circuit on the interior of the unit without otherwise disassembling the unit; and in addition, the removal of the cover plates 22 in no way affects the utility of the central frame in supporting and making electrical connection to the electronic circuit carried thereby. It should moreover be noted that one or both of the cover plates 22 may, if desired, be left off of the unit to increase ventilation of the electronic circuit carried by the central frame; and the frame unit remaining is still complete and highly useful. This must be compared with structures suggested heretofore wherein no parts could be left off of the supporting unit without undoing the entire structure.

As will be appreciated from the foregoing discussion, the overall unit finds particular use as a plug-in unit for unitized blocks of electronic circuitry. The construction of the unit is such that quick assembly or disassembly of the unit may be effected, and the side or cover plates of the unit may be snapped into or out of the unit without the necessity of removing screws. Complete disassembly of the frame can be effected by the removal of only two screws 14; and this represents a significant advantage over units suggested heretofore wherein assembly of the unit requires the removal of a large number of screws and in many cases the removal of plugs, sockets, etc.

The two-section central frame also exhibits a number of advantages over units suggested heretofore. In particular, the use of two separable sections permits the plug to be located in one of the said center section members, while electronic tube sockets, handles, etc. (as will be described) may be located in the other center section. The two-section open-sided center frame construction also permits each center section part to be punched separately for economy of production; and in addition, as mentioned previously, makes it possible for the electronic circuitry to be easily wired within the case or, in the alternative, to be completely fabricated external of and independent of the case, following which the case can be placed around the circuitry. This situation must again be compared with other types of cases suggested heretofore which require the circuit to be built up within extremely close confines of the case itself, thereby greatly complicating the fabrication and wiring of the overall unit.

The use of flush fitting cover surfaces, in addition to providing good appearance, also provides a maximum of interior space for a given overall volume of unit, inasmuch as there is very little overlapping of the metal parts comprising the case. Other types of cases suggested heretofore actually have large areas of overlapping metal which reduce the available space within the case, and detract from the appearance of the case. Moreover, as mentioned previously, the cover plates 22, when in place, act to support the internal surfaces of the central frame thereby giving a unit of substantially greater structural strength than has been possible heretofore; and these cover plates may, if desired, be easily removed and/or left off the unit without undoing the whole structure.

The case itself provides housing in relatively small slender packages which can be plugged into racks to provide computing or other electronic functions. When so mounted, the cases provide shielding for the circuitry therein, and said cases may be readily withdrawn and opened for purposes of repairing or changing the circuitry contained therein. Moreover, the shape of the case permits for side-to-side close-up mounting of plural units in the aforementioned racks; and a plurality of cases of the types described can in fact be hinged to one another so that when such hinged units are removed from the socket assemblies they can be opened like the page of a book, but when closed they snap together and provide a highly compact overall structural and electrical unit.

From the point of view of fabrication, the case is relatively simple and inexpensive to manufacture. In addition, the machinery employed to make the case can be so arranged that various sizes of units can be produced with the same set of tooling by merely changing gauging blocks. This must be compared with the manufacture of other types of cases suggested heretofore which require dies built for a particular size of case, thereby limiting the case sizes available unless large sums are expended for retooling. The overall case is therefore cheaper to manufacture and maintain and exhibits a number of significant structural and operational advantages over cases of types suggested heretofore.

The particular unit shown in FIGURES 1 through 4 is primarily adapted for use with transistors and/or printed circuits and the like. Upon occasion, however, it is desired to incorporate vacuum tubes into the overall modular unit; and when these additional components are desired, a casing unit of the type already described can nevertheless be employed, with the advantages already described, through the simple expedient of modifying the upper portion 11 of the central frame.

Figure 5:
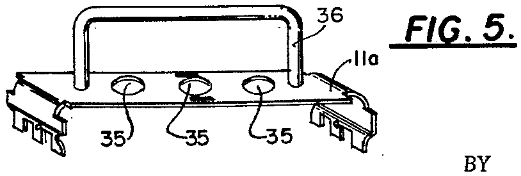
FIGURE 5 is a further perspective view of a modified structure, such as may be employed in the arrangement of FIGURE 1.

Referring to FIGURE 5, it will be seen that this upper portion, designated 11*a*, can be punched at a plurality of locations 35 for the reception of tube sockets extending above the said portion 11*a*. The other portions of member 11*a*, including the several slots, indentations, depressions, etc., nevertheless remain the same and perform functions similar to those already described in reference to FIGURES 1 through 3. In addition, a handle 36 can be attached, as shown in FIGURE 5, to portion 11*a* (or to portion 11) to facilitate installation and removal of the overall unit from a rack.

Other modifications will be suggested to those skilled in the art, and it must therefore be emphasized that the foregoing discussion is meant to be illustrative only and should not be considered limitative of my invention. All such modifications and variations as are in accord with the principles described are meant to fall within the scope of the appended claims.

Having thus described my invention, I claim:

1. A housing for electrical circuits comprising a flat-walled open-sided substantially rectangular frame, a first pair of depressions spaced from one another adjacent one of the open sides of said frame and located respectively at two adjacent corners of said rectangular frame, a second pair of depressions spaced from one another adjacent the other open side of said frame and located in spaced relation to said first pair of depressions at said two adjacent corners of said rectangular frame, a pair of substantially rectangular cover plates adapted to be disposed within said rectangular frame to close and brace the open sides of said frame respectively, one of said cover plates including an adjacent pair of offset corners adapted to be removably seated within said first pair of depressions, and the other of said cover plates including a similar pair of adjacent offset corners adapted to be removably seated within said second pair of depressions, and disengageable latching means extending between said frame and said pair of cover plates in spaced relation to the offset corners of said cover plates whereby, upon disengagement of said latching means, said cover plates may be pivoted about their said offset corners in said pairs of depressions and thereafter removed from the open sides of said frame.

2. A casing for an electronic circuit comprising an open sided, flat walled substantially rectangular frame having rounded corners, means for mounting a planar terminal board within said frame, said frame having a pair of substantially rectangular slots in each of two adjacent rounded corners, said slots being disposed adjacent to and spaced from the peripheral edges of said frame by the approximate thickness of the frame walls, a pair of depressions in each of the other two adjacent rounded corners opposite the said slots, said depressions having a depth approximately equal to the thickness of said frame walls, a pair of substantially flat rectangular cover plates dimensioned to fit within said frame so that the outer edges of said cover plates are substantially flush with the inner walls of said frame adjacent the peripheral edges of said frame, two adjacent corners of each of said cover plates being bent inward for insertion into and engagement with said substantially rectangular slots thereby to hold one end of each said cover plate in place, the two remaining corners of each of said cover plates adapted to be inset into said corner depressions of said rectangular frame, the inner side walls of said frame including abutment means, and spring clip means attached to each of said cover plates for engagement with said abutment means to hold said remaining corners of each said cover plate in place adjacent said frame corner depressions.

3. The casing of claim 2 wherein said frame comprises a pair of U-shaped parts having the respective legs thereof disposed in opposed overlapping substantially aligned relation to one another, said abutment means comprising further slots in the legs of one of said U-shaped parts.

4. The casing of claim 3 wherein said pair of U-shaped parts are held in separable engagement with one another by readily disengageable fastening means, said mounting means being adapted to mount said planar terminal board on one only of said U-shaped parts thereby to permit complete and ready separation of said U-shaped parts from one another by disengagement of said fastening means without disturbing the mounting of said terminal board.

5. A casing for an electronic circuit comprising an open sided, flat walled substantially rectangular frame, said frame having a pair of elongated slots in each of two adjacent corners, said slots being disposed adjacent to and spaced from the peripheral edges of said frame, a pair of depressions in each of the other two adjacent corners of said frame opposite the said slots, said depressions opening into the peripheral edges of said frame, a pair of substantially flat rectangular cover plates dimensioned so that the other surfaces of said cover plates are substantially flush with the outer peripheral edges of said frame, two adjacent corners of each of said cover plates being bent inward to engage said slots thereby to hold one end of each said cover plate in place, the two remaining corners of each of said cover plates being adapted to be inset into said corner depressions of said rectangular frame, the interior walls of said frame including abutment means, and resilient means attached to each of said covers adapted to removably engage said abutment means thereby to hold the other ends of said cover plates in place within said corner depressions.

References Cited in the file of this patent

UNITED STATES PATENTS

| | | |
|---|---|---|
| 1,843,832 | Sachs | Feb. 9, 1932 |
| 1,887,956 | Rypinski | Nov. 15, 1932 |
| 1,895,791 | Garford | Jan. 31, 1933 |
| 2,100,226 | Stenberg | Nov. 23, 1937 |
| 2,658,101 | Coxe | Nov. 3, 1953 |
| 2,735,964 | Grieve | Feb. 21, 1956 |
| 2,764,713 | Alden | Sept. 25, 1956 |
| 2,777,893 | Rosso | Jan. 15, 1957 |
| 2,864,977 | Witt | Dec. 16, 1958 |

FOREIGN PATENTS

| | | |
|---|---|---|
| 322,825 | Great Britain | Dec. 12, 1929 |
| 330,676 | Great Britain | June 19, 1930 |
| 914,909 | France | Oct. 22, 1946 |

UNITED STATES PATENT OFFICE
CERTIFICATE OF CORRECTION

Patent No. 3,052,821 September 4, 1962

Ray R. Scoville

It is hereby certified that error appears in the above numbered patent requiring correction and that the said Letters Patent should read as corrected below.

Column 7, line 29, for "other" read -- outer --.

Signed and sealed this 19th day of February 1963.

(SEAL)
Attest:

ESTON G. JOHNSON
Attesting Officer

DAVID L. LADD
Commissioner of Patents